United States Patent Office 3,440,632
Patented Apr. 22, 1969

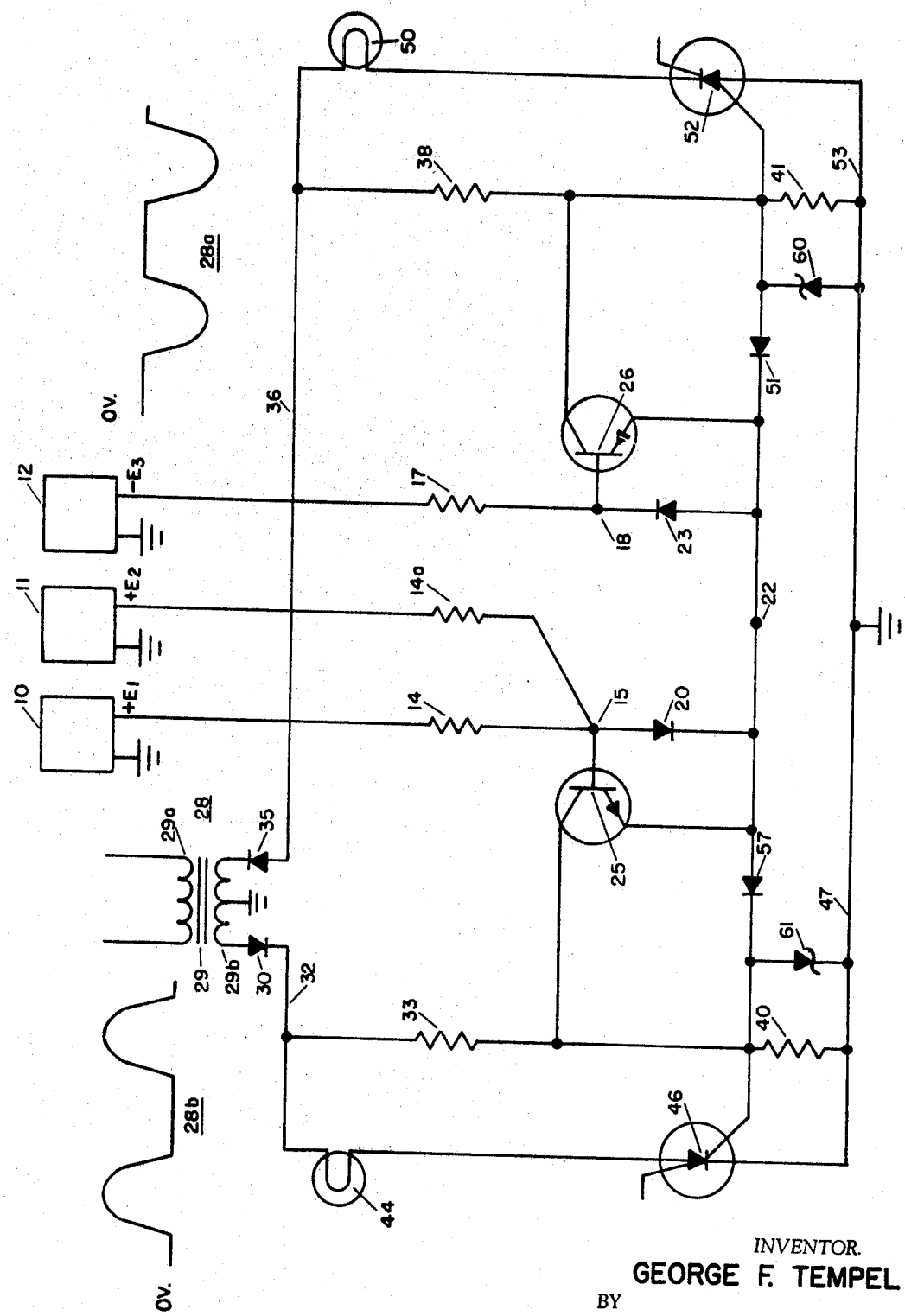

3,440,632
OVERLOAD AND OUT-OF-REGULATION INDICATOR FOR PLURAL POWER SUPPLIES
George F. Tempel, Monmouth County, N.J., assignor to Electronic Associates Inc., Long Branch, N.J., a corporation of New Jersey
Filed Oct. 18, 1965, Ser. No. 497,356
Int. Cl. G08b 21/00; H01h 83/06, 83/12
U.S. Cl. 340—248                                    16 Claims This invention relates to an indicator system for power supplies and more particularly to an overload and out of regulation indicator or alarm for such power supplies.

Many electronic systems such as computers and electronic instruments require one or more regulated power supplies and such systems will not operate properly and will not provide accurate results if the power supplies are not maintained within a required tolerance. Thus if the output voltage of the power supply changes from a set tolerance the system which it is supplying with power will operate inaccurately. It has been known to provide such accurately regulated power supplies with an indicator such as a light alarm or buzzer alarm which indicates that the power supply output voltage is not within its set tolerance or has failed entirely. Thus when the alarm flashes or buzzes the operator or repairman recognizes that the power supply is not working correctly and makes the necessary repairs.

Prior indicators for accurately regulated power supplies have left much to be desired as the drive or power source for the indicator has been the same drive as for the highly regulated supplies. Thus when the drive has developed a fault and produced zero output then the indicator itself would not operate to produce a light or buzz alarm. In addition in prior systems when all of the power supplies failed simultaneously and produced zero voltage output, then the indicator would also not operate.

Accordingly an object of the present invention is an overload and out of regulation indicator having as its driving source a separate and non-complex supply which is in no way connected with the drive for the accurately and highly regulated power supplies.

Another object of the present invention is in indicator which provides a visual or an audio alarm if any one or if simultaneously all of the highly regulated power supplies produce zero voltage output.

In accordance with the present invention there is provided an overload and out of regulation indicator for regulated power supplies having a main current loop including at least two unidirectional devices. The regulated supplies having positive-going output potentials are connected to one end or side of the loop and the supplies having negative output potentials are connected to the other end or side of the loop. In this manner there is provided at the junction of the unidirectional devices a virtual reference potential. A left-hand alarm circuit is connected to the junction for producing an alarm indication when the potential of the junction changes in a positive-going direction beyond a predetermined tolerance or limiting value. A right-hand alarm circuit is connected to the junction for producing an alarm indication when the potential of the junction changes in a negative-going direction beyond a predetermined tolerance or limiting value. In this manner as long as at least one of the supplies is not grounded or open circuited and current flows through the current loop then an alarm is indicated when the supplies provide a variation in the junction potential from a predetermined tolerance.

Further in accordance with the invention there is provided a three terminal semiconductor switching device, a controlled device and a diode for each of said alarm circuits. Each switching device has two of its terminals connected across a respective unidirectional device and is maintained turned ON as long as current flows through said loop and its respective unidirectional device is turned ON. Current flow from a source may be traced through each of the switching devices to the junction. Each of the controlled devices is connected in a circuit with an alarm indicator and is maintained normally turned OFF to provide open energization circuit for an alarm indicator. When all of the regulated supplies fail and current no longer flows through the main current loop the unidirectional devices are turned OFF to turn OFF the semiconductor devices. As a result, current from the source flows through alternate paths which are connected to the control devices and are effective to turn ON the controlled devices. With the controlled devices turned ON the energization circuits for the indicator devices are completed so that an alarm condition is indicated.

For further objects and advantages of the invention and for typical embodiments thereof, reference is to be had to the following description taken in conjunction with the accompanying drawing which schematically illustrates an indicator system embodying the invention.

Referring now to the drawing, the indicator system is shown as having provision for application of output voltages from three regulated supplies 10–12. Supplies 10 and 11 provide highly regulated positive output voltages, viz., $+E_1$ and $+E_2$ and highly regulated supply 12 provides a negative voltage, viz., $-E_3$. It will be understood that many more regulated supplies may be connected to the indicator circuit embodying the invention with the only limitation being that at least one positive supply be connected and at least one negative supply be connected.

Each of the positive potential supplies 10 and 11 has its output connected by way of resistors 14 and 14a respectively to a positive supply junction 15. In similar manner the negative supply 12 has its output terminal connected by way of a resistor 17 to a negative supply junction 18. Thus, current flow may be traced by way of supplies 10 and 11, through resistors 14 and 14a respectively, junction 15, a diode 20, reference point 22, a diode 23, negative supply junction 18, resistor 17 and to the negative supply 12. The foregoing current flow through point 22 may be considered a "main current loop" for the indicator system of the present invention.

Resistors 14, 14a and 17 are selected with respect to the value of the voltages $+E_1$, $+E_2$ and $-E_3$ so that point 22 is at a predetermined reference potential such as zero volts or virtual ground. In addition the foregoing resistors are selected so that the current flow through the main current loop is of sufficient magnitude to turn ON diodes 20 and 23. For example, such current may be in the order of one milliampere.

It will be understood that many more power supplies may be connected by way of respective resistors to junctions 15 and 18 with positive supplies connected to junction 15 and negative supplies connected to junction 18. However, such resistors must be selected so that point 22 is maintained at the reference potential of zero volts.

With power supplies 10–12 maintained within their desired tolerance, point 22 is maintained at zero volts. However when one of the supplies 10–12 increases or decreases in potential for example, point 22 varies from zero volts plus or minus depending upon the change in potential of supplies 10–12. When such changes vary beyond a predetermined limit an alarm is indicated in the manner later to be described.

Normally ON diodes 20 and 23 are effective to maintain turned ON switching transistors 25 and 26 respectively. More particularly, left hand transistor 25, of the NPN type for example, has its base connected to junction 15 and its emitter connected to point 22. With a potential drop across diode 20 positive at its anode or junction 15 and negative at its cathode or point 22, transistor 25 is maintained turned ON. In similar manner right hand switching transistor 26, of the PNP type for example, has its base connected to junction 18 and its emitter to point 22. Thus with a potential drop across diode 23 with its cathode or junction 18 negative with respect to its anode or point 22 transistor 26 is maintained turned ON. In a typical example, in order to provide for proper conductivity, transistors 25 and 26 may be made of germanium and diodes 20 and 23 of silicon. Thus the potential drop across diodes 20 and 23 is sufficient to turn ON germanium transistors 25 and 26 respectively.

Collector current for transistor 25 is provided by a driving source 28 of the indicator system. Specifically driving source 28 comprises a transformer 29 having its primary 29a connected to a source of alternating current and its secondary 29b having its center tap connected to ground. The left hand side of secondary winding 29b is connected by way of a rectifying diode 30, conductor 32, a resistor 33 to the collector of switching transistor 25. In this manner collector current is provided for transistor 25 and such current flows through that transistor to point 22 which is at virtual ground potential. In similar manner the collector current circuit for transistor 26 may be traced by way of the secondary winding 29b, a rectifying diode 35, conductor 36, a resistor 38 to the collector of that transistor. With switching transistors 25 and 26 turned ON the currents from the driving source 28 flow through the lower impedance paths provided by these transistors and currents do not flow through another path to ground by way of resistors 40 and 41. It is to be understood that the collector currents for transistors 25 and 26 are very small in value, as compared with the current flowing in the main current loop through points 15, 22 and 18. For example, the collector currents for these transistors may be approximately 20 microamperes.

The driving source also provides a source of current for the left and right hand alarm circuits with the left hand circuit being traced by way of conductor 32, a bulb 44, a silicon controlled rectifier 52, and a conductor 53, to ground. With rectifiers 46 and 52 maintained normally turned OFF, it will be understood that bulbs 44 and 50 are not energized and do not emit an alarm light. However if a fault occurs in the power supplies 10-12 as for example, power supply 11 decreases in positive potential to zero volts, the potential at point 22 changes in a negative going direction. A diode 51 has its cathode connected to point 22 and when the negative going potential at that point is of sufficient magnitude, diode 51 is turned ON. With diode 51 conductive the negative potential at point 22 is applied to the anode gate terminal of rectifier 52 and, if it is of sufficient negative value with respect to the anode potential, that rectifier is turned ON. With rectifier 52 turned ON a circuit is now completed for energization of bulb 50 by way of the driving source 28 to ground.

It will now be understood that when point 22 varies in a negative direction by a predetermined limiting value from its zero volt reference, then right hand bulb 50 lights and indicates an alarm condition. The magnitude of the limit is determined by the potential drop across diode 51 and potential with respect to ground required to turn ON diode 52. For example, the drop across diode 51 may be one-half a volt and the negative potential for diode 52 may also be one-half volt, to make a total of one volt in a negative direction from the reference which may be considered as the negative tolerance of the indicator system.

After the fault in supply 11 has been remedied and its potential returns to its desired value, point 22 returns to zero volts and a negative-going potential is no longer applied to the anode gate terminal of that rectifier 52. That rectifier is maintained conductive until its cathode potential decreases to zero volts which occurs every other half-cycle as shown by waveform 28a.

In manner similar to that described above, if the potential of supply 12 decreases in a positive-going direction such as ground potential, then the potential at point 22 changes in a positive-going direction. Such positive-going potential is applied to an anode of a diode 57 which is effective to turn ON that diode and to apply a positive-going potential to a cathode gate terminal of diode 46. When that positive-going potential applied to diode 46 is of sufficient magnitude to turn ON that diode, then a circuit is completed for energization of bulb 44 to indicate an alarm condition. Thus, when the potential at point 22 changes in a positive-going direction of sufficient limiting magnitude, then the left hand alarm is actuated. The positive-going tolerance may, for example, be one-half volt across diode 57 and one-half volt to turn ON diode 46, for a total of one volt. After the fault has been corrected and point 22 returns to its reference potential, diode 46 remains turned ON until the driving source potential returns to zero volts which occurs in alternate cycles, as shown by the waveform 28b. It will be understood that the potential at point 22 also changes in a positive-going direction to turn ON diode 46 if supply 12 fails by becoming open circuited. Specifically, current flow may be traced through resistors 14 and 14a, junction 15, diode 20, diode 57 and then through a resistor 40 and conductor 47 to ground. The potential drop across resistor 40 applies to the cathode gate terminal of diode 46 a voltage of sufficient value to turn ON that diode and thereby to indicate a left hand alarm.

It will now be understood that for faults occurring in the supplies 10-12 such as grounding or open circuiting which provide a change in voltage at point 22, either in an negative-going direction or a positive-going direction beyond a set or predetermined tolerance, then the respective alram bulbs 44 or 50 will be energized. Whatever faults occur, current must flow through the main current loop, and thus, at least one of the supplies 10-12 must be acting as a source and have a path to ground. For example, all but one of the supplies may be at ground potential or open circuited. If such conditions are not met and a current does not flow through the main current loop, then this fault is detected in the following manner.

If no main current flows for the reason that all of the supplies 10-12, for example, have grounded outputs, then there no longer is a potential drop across diodes 20 and 23. Thus, with zero potential drop between their respective bases and emitters, transistors 25 and 26 are turned OFF. Thus, in the left hand side of the indicator system, current flow from the drivng source 28 may now be traced by way of diode 30, conductor 32, resistor 33 and through resistor 40 to ground. Thus, with a potential drop across resistor 40 positive with respect to ground, a positive potential is applied to the cathode gate terminal of diode 46, thereby to turn ON that diode. With diode 46 turned ON a circuit is completed for energization of alarm bulb 44 indicating an alarm condition. In similar manner, with transistor 26 rendered nonconductive, current flow from the driving soudce 28 may be traced through resistor 41, to provide a negative potential across resistor 41 with respect to ground. In this manner a turn ON potential is applied to the anode gate terminal of diode 52, thereby turning ON that diode. With diode 52 turned ON an energizing circuit is completed for bulb 50 indicating an alarm condition. Thus, in accordance with the invention, if conditions occur to the regulated supplies 10-12 so that current does not flow through the main current loop, then both bulbs 44 and 50 are energized. The conditions that may occur to provide zero current through the main current loop are (1) all of the supplies 10-12 are open circuited, (2) all supplies 10-12 have their outputs grounded and (3) the main power source for supplies 10-12 fails. Thus, by the use of a separate and simple supply, viz., driving source 28, the indicator circuit of the present invention operates even though the supplies 10–12 fail simultaneously.

It will be understod that after the foregoing faults have been corrected, current again flows through the loop bringing the potential at point 22 to zero volts. Accordingly a potential drop is produced across diodes 20 and 23 and transistors 25 and 26 will again be turned ON. At that time current in the left hand section flows through the lower impedance path of conductive transistor 25 rather than through resistor 40. In this manned a switching potential is no longer applied to diode 46, and upon application of zero volts to its anode from source 28, diode 46 is turned OFF. Similarly, with transistor 26 conductive current flows through the lower impedance path of transistor 26 rather than through resistor 41, and thus a turn ON potential is no longer applied to diode 52. Thus, upon application of zero volts to its cathode, diode 52 is turned OFF. Accordingly, both alarm bulbs 44 and 50 are no longer energized and the indicator system is reset automatically to its original condition.

In order to limit the voltage supplied to the anode gate terminal diode 52 there may be provided a stabistor 60 connected between the gate terminal and the anode. Additionally, in order to limit the voltage at the cathode gate terminal of diode 46, there may be provided a stabistor 61 connected between that gate terminal and the cathode. Stabistors 60 and 61 may limit the applied voltage to approximately 1.3 volts.

With the above understanding of the invention, it will be readily understood that changes may be made in certain of the circuit arrangements. For example, alarm bulbs 44 and 50 may be replaced by buzzers or other noise makers to indicate a fault. In addition driving source 28 providing a potential which periodically goes to zero may be replaced by a D.C. source. However, with a D.C. source, once rectifiers 46 and 52 have been turned ON they will not automatically turn OFF. Thus an additional manual turn OFF circuit is required. In this manner, the indicator system of the present invention provides a transient fault indicator.

What is claimed is:

1. A system for indicating an alarm condition when one or more of a plurality of regulated power supplies vary from their predetermined supply potential comprising
   current loop means including at least two unidirectional devices,
   means connecting supplies of one polarity to one end of said loop means and supplies of the other polarity to another end of said loop means to provide at a junction of said devices a virtual reference potential,
   a first alarm circuit connected to said junction for producing an alarm indication when variation in said predetermined supply potential provides a change in potential in a positive-going direction beyond a predetermined tolerance, and
   a second alarm circuit connected to said junction for producing an alarm indication when variation in said predetermined supply potential provides a change in junction potential in a negative-going direction beyond a predetermined tolerance.

2. The system of claim 1 in which said first alarm circuit includes a first diode and a first controlled rectifier,
   said first diode being connected between said junction and a control electrode of said rectifier whereby when the polarity of said junction changes in a positive-going direction beyond said predetermined tolerance said first diode is turned ON to turn ON said rectifier to complete an energization circuit for said first alarm circuit.

3. The system of claim 1 in which said second alarm circuit includes a second diode and a second controlled rectifier,
   said second diode being connected between said junction and a control electrode of said rectifier whereby when said junction changes in a negative-going direction beyond said predetermined tolerance said second diode is turned ON to turn ON said second rectifier to complete an energization circuit for said second alarm circuit.

4. The system of claim 3 in which there is provided a driving source for said first and second alarm circuits, and
   means connecting an alarm indicator between said driving source and said second rectifier whereby when said second rectifier is turned ON current flows from said driving source through said alarm indicator and said second rectifier.

5. The system of claim 1 in which there is provided a source of supply for said first and second alarm circuits,
   a semiconductor switching device for each of said unidirectional devices each having at least three electrodes with two of said electrodes connected across its respective unidirectional device, and
   means connected to said third electrodes of each of said semiconductor devices and to said source of supply to turn OFF said unidirectional devices and said switching devices when no current flows through said current loop for producing an alarm condition.

6. The system of claim 1 in which each of said alarm circuits includes a switching transistor and a controlled rectifier,
   each of said switching transistors having a base and an emitter connected across a respective one of said unidirectional devices to turn ON said transistor when current flows through said current loop and its respective semiconductor device is turned ON,
   a source of supply for providing current flow through each of said turned ON transistors to said virtual reference potential, and
   means connected to each of said transistors and to said rectifiers for turning ON said rectifiers when said transistors are turned OFF when no current flows through said current loop thereby to complete energization circuits in said first and second alarm circuits to indicate an alarm condition.

7. A system for indicating an alarm condition when one or more of a plurality of regulated power supplies varies from a predetermined limiting value comprising
   means having two terminals including at least two unidirectional devices connected for flow of current in a main loop between said terminals,
   first resistance means connecting supplies of one polarity to a first of said terminals, and second resistance means connecting supplies of the other polarity to a second of said terminals to provide at a junction of said devices a virtual reference potential,
   a first alarm circuit connected to said junction for producing an alarm indication when the potential of said junction changes in a positive-going direction beyond said predetermined limiting value, and
   a second alarm circuit connected to said junction for producing an alarm indication when the potential of said junction changes in a negative-going direction beyond said predetermined limiting value.

8. The system of claim 7 in which said first alarm circuit includes a first diode and a first controlled device,
   said first diode being connected between said junction and a control electrode of said first controlled device whereby when the polarity of said junction changes in a positive-going direction beyond said predetermined limiting value said first diode is turned ON to turn ON said controlled device to complete an energization circuit for indicating an alarm condition in said first alarm circuit.

9. The system of claim 7 in which said second alarm circuit includes a second diode and a second controlled device,
　said second diode being connected between said junction and a control electrode of said second controlled device whereby when said junction changes in a negative-going direction beyond said predetermined limiting value said second diode is turned ON to turn ON said second controlled device to complete an energization circuit for indicating an alarm condition in said second alarm circuit.

10. The system of claim 8 in which there is provided a driving source for said first and second alarm circuits, and
　means connecting an alarm lighting device between said driving source and said first controlled device whereby when said second controlled device is turned ON current flows from said driving source through said alarm lighting device and through said second controlled device.

11. The system of claim 7 in which there is provided a source of supply for said first and second alarm circuits,
　a switching transistor for each of said unidirectional devices each having at least three electrodes with two of said electrodes connected across its respective unidirectional device, and
　said alarm circuits including means connected to said third electrodes of each of said transistors and to said source of supply to turn OFF said transistors when no current flows through said loop for producing an alarm condition.

12. The system of claim 7 in which each of said alarm circuits includes a switching transistor and a controlled rectifier,
　each of said switching transistors having a base and an emitter connected across a respective one of said unidirectional devices to turn ON said transistor when current flows through said loop and its respective semiconductor device is turned ON,
　a source of supply for providing current flow through each of said turned ON transistors to said virtual reference potential,
　alternate current path means connected to each of said transistors and to said controlled rectifiers for turning ON said rectifiers when said transistors are turned OFF when no current flows through said current loop thereby to complete energization circuits in said first and second alarm circuits from said source of supply through said rectifiers to indicate an alarm condition.

13. The switching system of claim 12 in which said source of supply includes means for periodically varying the supply potential to zero volts as a limit thereby to turn OFF said rectifiers after current flows through said current loop and said transistors are turned ON.

14. A system for indicating an alarm condition when one or more of a plurality of regulated power supplies varies from a predetermined tolerance or when all of said regulated supplies fail comprising
　current loop means including at least two unidirectional devices,
　means connecting supplies of one polarity to one end of said loop means and supplies of the other polarity to another end of said loop means to provide at a junction of said devices a virtual reference potential and to turn ON both of said devices upon current flow through said loop means,
　first and the second alarm circuits each including a controlled device and a three terminal switching device having two terminals connected across a respective one of said unidirectional devices,
　a source of supply connected to a third terminal of each of said switching devices whereby each of said switching devices is turned ON when its respective unidirectional device is turned ON to provide current flow through said switching device to said junction, and
　alternate current path means being connected to each of said controlled devices and to said third terminals for turning ON said controlled devices when switching devices are turned OFF when no current flows through said current loop to complete energization circuits for indicating an alarm condition.

15. The system of claim 14 in which each of said alarm circuits includes a diode connected between said junction and its respective controlled device for turning ON a controlled device when the potential of said junction changes in either a positive-going or a negative-going direction beyond said predetermined tolerance.

16. The system of claim 15 in which said energization circuits are supplied by said source of supply and said supply includes means for periodically varying the supply potential to zero volts as a limit thereby to turn OFF said controlled devices after said switching devices are turned ON.

References Cited

UNITED STATES PATENTS 3,037,151　5/1962　Cimerman et al. _____ 317—27
3,311,907　3/1967　Teal _____ 340—248

JOHN W. CALDWELL, *Primary Examiner.*

DANIEL K. MYER, *Assistant Examiner.*

U.S. Cl. X.R.

307—131